(12) United States Patent
Schultz

(10) Patent No.: US 12,305,619 B2
(45) Date of Patent: May 20, 2025

(54) HYBRID WIND AND SOLAR ENERGY GENERATING SYSTEM

(71) Applicant: RG Resource Technologies, Inc., Oxford, MI (US)

(72) Inventor: Garth James Schultz, Oxford, MI (US)

(73) Assignee: RG Resource Technologies, Inc., Oxford, MI (US)

( * ) Notice: Subject to any disclaimer, the term of this patent is extended or adjusted under 35 U.S.C. 154(b) by 0 days.

(21) Appl. No.: 18/637,277

(22) Filed: Apr. 16, 2024

(65) Prior Publication Data

US 2024/0344500 A1    Oct. 17, 2024

Related U.S. Application Data

(60) Provisional application No. 63/460,730, filed on Apr. 20, 2023, provisional application No. 63/459,829, filed on Apr. 17, 2023.

(51) Int. Cl.
*F03D 9/00* (2016.01)
*F03D 9/11* (2016.01)
*H02S 10/12* (2014.01)

(52) U.S. Cl.
CPC ............ *F03D 9/007* (2013.01); *F03D 9/11* (2016.05); *H02S 10/12* (2014.12)

(58) Field of Classification Search
CPC ............ F03D 9/007; F03D 9/11; H02S 10/12
See application file for complete search history.

(56) References Cited

U.S. PATENT DOCUMENTS

| | | |
|---|---|---|
| 2010/0183443 A1 | 7/2010 | Thorne |
| 2014/0356163 A1 | 12/2014 | Schwaiger |
| 2017/0356422 A1 | 12/2017 | Armstrong |
| 2024/0356480 A1* | 10/2024 | Carmel ............... H02S 20/20 |

FOREIGN PATENT DOCUMENTS

WO    2021/141514 A1    7/2021

OTHER PUBLICATIONS

International Search Report and Written Opinion for International Application No. PCT/US2024/024796 mailed dated Aug. 12, 2024, 16 pages.

* cited by examiner

*Primary Examiner* — Viet P Nguyen
(74) *Attorney, Agent, or Firm* — RPG Law Group; Richard P. Gilly

(57) ABSTRACT

A hybrid wind and solar energy generating system includes one or more solar arrays of solar panels arranged at an angle relative to a horizontal plane of reference, defining leading and trailing boundaries on such panels. A wind turbine is mounted proximate to the trailing boundary on a horizontal axis with blades extending longitudinally and in operative proximity to the trailing boundaries. A source of wind is amplified passing over the windward side of the solar panels to form a resultant wind vector extending outwardly off the trailing boundary.

17 Claims, 7 Drawing Sheets

HYBRID WIND AND SOLAR ENERGY GENERATING SYSTEM

FIELD

This disclosure relates to wind and solar energy generation in general, and a power production system in particular.

BACKGROUND

The production of power from wind and from the sun often is associated with various drawbacks and disadvantages, making such systems inefficient, impractical, or otherwise ill-suited in many applications, environments, and even during certain times of day or under weather conditions.

It would be advantageous to address some of these drawbacks and disadvantages with a corresponding system which produces energy more effectively, more consistently, or otherwise more advantageously than the current art.

SUMMARY

In one suitable implementation, this disclosure relates to a land-based alternative energy system that combines wind and solar power production into a single integrated unit. As such, the system of the current disclosure may be considered a "hybrid" wind and solar energy generating system. In certain implementations, the system also includes a feature which tracks the wind, the sun, or other parameters to optimize operations of the respective wind and solar production elements of said system.

In other suitable implementations, the hybrid wind and solar energy generating system makes use of at least one rotatably mounted solar array. The solar array has a windward surface, that is, a solar panel on such solar array which is orientable relative to a source of wind so that the wind and its wind vector impinges upon the windward surface. The wind vector may strike windward surface at any suitable angle, and thus may include normal components as well as incident, that is, angular components. The windward surface has an area which is angled relative to a horizontal plane of reference. As such, wind travels from a leading boundary at a forward end of the angled area and exits or departs from the windward surface at a trailing boundary downwind from the source of wind. The angled area is sufficiently large and oriented relative to source wind vector to form a resultant wind vector at the trailing boundary. The resultant wind vector is directed outwardly downwind from the trailing boundary and has a greater force than the wind source vector. As such, the wind speed of the source wind has been increased proximate to the trailing edge of the panel and extending outwardly therefrom. A wind turbine is mounted in operative proximity to the foregoing solar array and located so that its blades are impinged upon by the resultant wind vector. An increase in energy output is thus afforded by the foregoing arrangement and associated interactions between the wind turbine and the windward surface of the solar panel.

In still other implementations, the system has an azimuth mount to which the above-described solar array and wind turbine are connected. A computer-implemented control system is provided for the azimuth mount and configured to rotate the position of the solar array and the wind turbine to optimize energy generation in response to solar and wind conditions.

In further implementations, a hybrid wind and solar energy generating system comprises two solar arrays in the form of solar panels mounted at 180 degrees from each other and having lower and upper edges. There are angled areas for each of the panels extending between the lower and upper edges to define respective leading and trailing edges. The solar panels are oriented to slope upwardly toward each other and the wind turbine is located in operative proximity to the respective trailing edges of both of the solar panels. The foregoing system may be oriented by a suitable control system so that one of the solar arrays is primarily oriented toward a wind source and the other of the solar arrays is oriented primarily toward a solar resource.

A more complete understanding of the present disclosure, and the attendant advantages and features thereof, will be more readily understood by reference to the following detailed description when considered in conjunction with the accompanying drawings, wherein:

DETAILED DESCRIPTION

Figure 1:
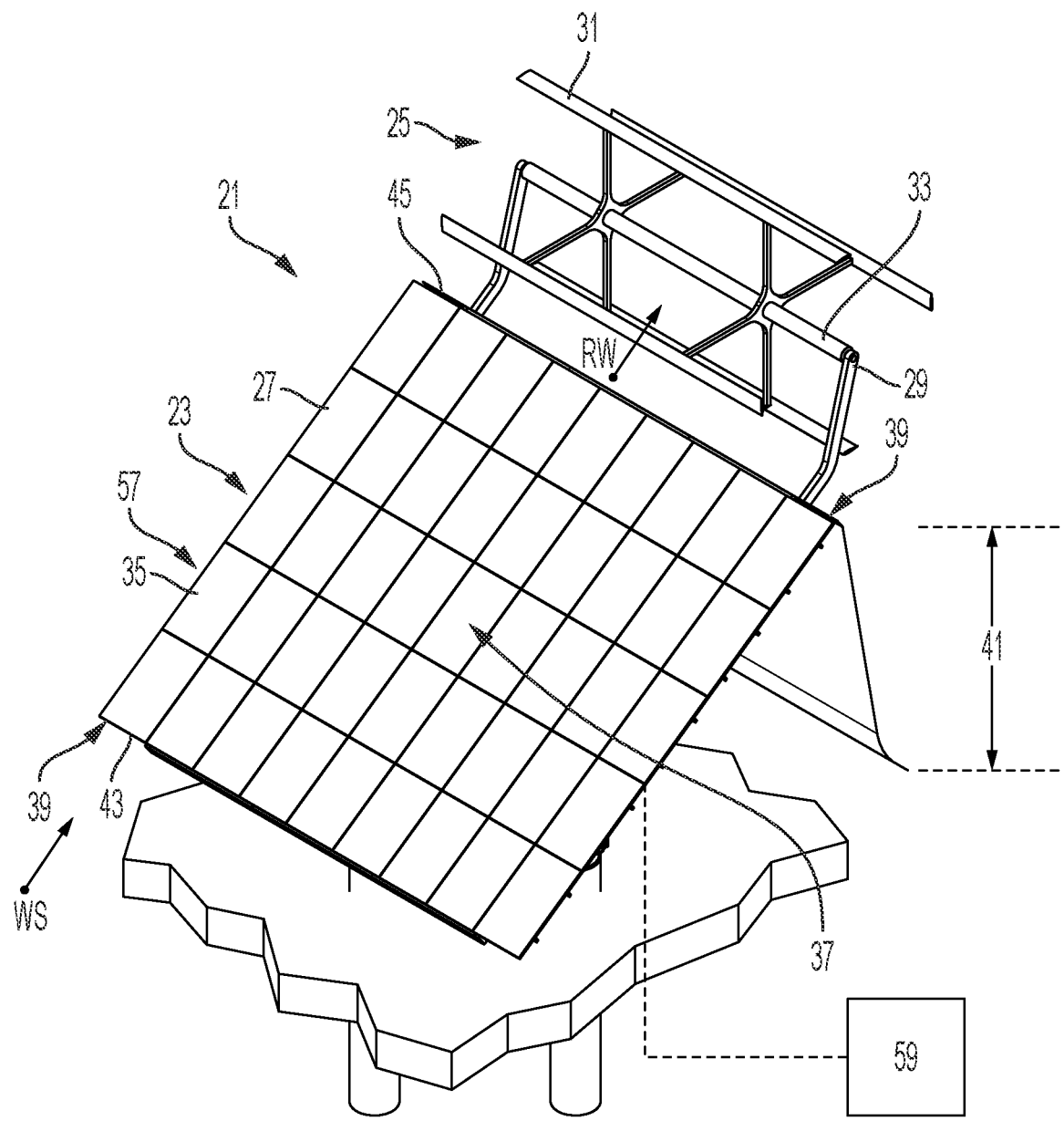
FIG. 1 is an isometric view of one possible implementation of a hybrid wind and solar energy generating system according to the present disclosure.
Figure 2:
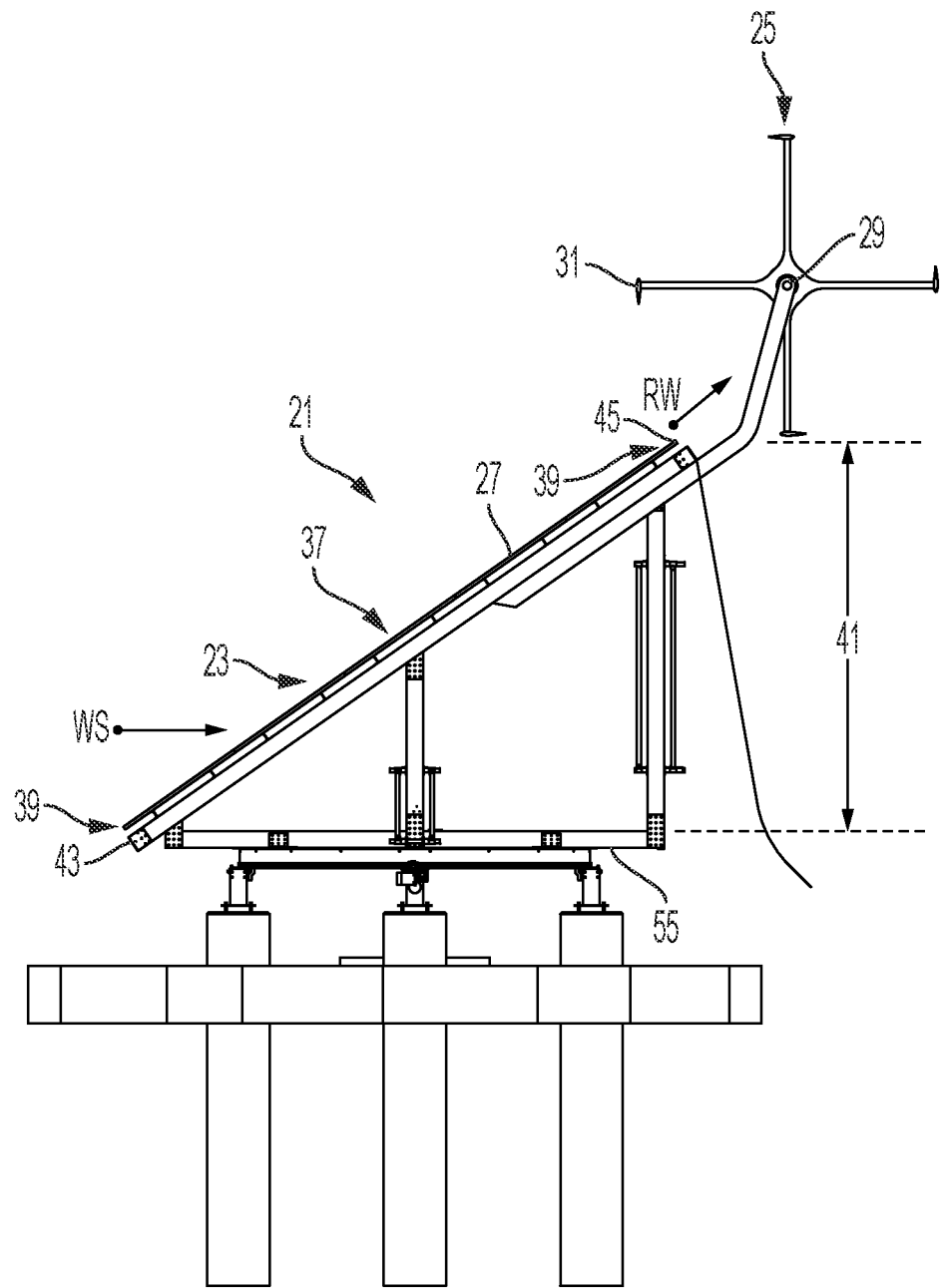
FIG. 2 is a side, elevational view of the system shown in FIG. 1.
Figure 3:
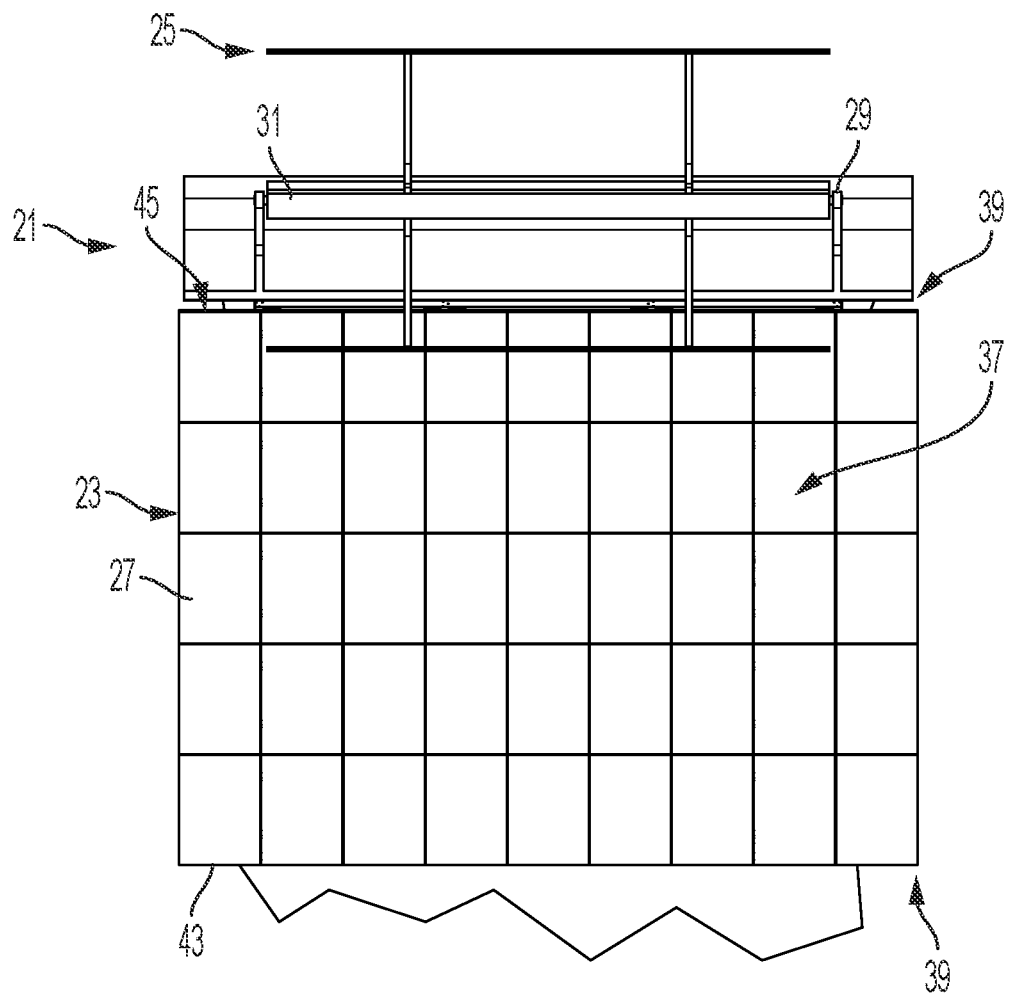
FIG. 3 is a top plan view of the system shown in FIGS. 1-2.

Referring now to the drawings, FIGS. 1-3 illustrate one possible implementation of the present disclosure. A hybrid wind and solar energy generation system 21 comprises a single solar array 23 and a wind turbine 25 mounted in operative proximity to solar array 23. In certain implementations, solar array 23 comprises one or more solar panels 27, and, as in the illustrated implementation, solar panels may be arranged to be coplanar with each other in a side-by-side arrangement. Other arrangements are likewise suitable.

Solar array 23 is orientable at a suitable angle relative to ground, horizon or other applicable base reference plane to define an angled area 37. Orientations of solar array 23 and its solar panels 27 may be varied based on particular applications and environmental factors and power generation goals for such applications.

In the illustrated implementation, wind turbine 25 rotates about a horizontal axis 29, rather than a vertical one. The term "horizontal" and its cognate forms, when used herein, encompass not only the traditional horizontal as shown in the illustrated implementation, but additional angular orientations having the referenced axis or other referenced component disposed at any angle relative to horizon, ground or base reference plane of 60 degrees or less, preferably 45 degrees or less (or, in the illustrated implementation, approximately at zero degrees). In certain applications, the entire system 21 may be disposed at an angle relative to traditional ground or horizon planes, causing the "horizontal" axis to exceed the above referenced angle preferences angles with reference to ground planes in absolute terms; however, in such applications, the axis would be horizontal when measured relative to a base reference plane for the angularly mounted system 21.

Wind turbine 25 has blades 31 disposed at one or more radial distances from horizontal axis 29, such blades 31 rotatably mounted relative thereto. Blades 31 are configured to generate energy by suitable rotation in response to wind, and can extend either radially outwardly from a hub coaxial with axis 29, or from axis 29 itself (not shown). In the illustrated implementation, blades 31 are mounted in an orbital arrangement at a radial distance R from axis 29, and extend a predetermined distance generally parallel to horizontal axis 29. The blade shape, curvature, areas of leading and trailing edges, and other wind turbine blade parameters may be varied depending on the application, but are generally selected to achieve target or benchmark energy generation values a given percentage of the time, or in response to other energy generation parameters or environmental conditions.

The illustrated embodiment comprises four of the blades 31, located at ninety degrees from each other about the 360 degrees of a rotatable shaft 33, and extending longitudinally along horizontal axis 29. Other configurations are likewise suitable, depending on the application and desired energy profile, output, and the like.

Shaft 33 and other turbine components are selected to have coefficients of static and dynamic drag small enough to rotate in response to anticipated wind speeds for the application.

Wind turbine 25, with its blades 31, and solar array 23, with its panels 27, are operatively associated with each other to generate energy from one or both of the power generation modalities, depending on any number of environmental or usage conditions, that is, a hybrid energy system 21 is formed by such operative association. Such operative association is established by suitable relative location of wind turbine 25 and its components relative to solar array 23 and its panels 27. Operative connection or association between the solar array 25 and turbine 25 may also involve size, configuration, and orientation of solar panels 27 relative to turbine 25.

The one or more solar panels 27 are selectively orientable relative to a wind source characterized by a wind source vector WS. Solar panel or panels 27, when so oriented, define a windward surface 35 upon which the wind source vector WS is either normal to or at least incident thereon.

The angled area 37 of windward surface 35 extends to terminate in opposite boundaries 39. As such, the presence of angled area 37 causes solar array 23 to define a bluff body 41 in terms of its aerodynamic characteristics relative to wind source vector WS. As shown, one of the boundaries 39 located on the windward panel 35 defines a leading boundary 43 upwind relative to the wind source, while the other boundary of windward surface 35 defines a trailing boundary 45 downwind of the wind source.

In this illustrated implementation, angled area 37 terminates at a trailing edge 47, and trailing boundary 45 corresponds to such trailing edge 47. Similarly, in this implementation, angled area 37 has an opposite edge, that is, leading edge 49, and the leading boundary of angled area 37 corresponds to leading edge 49. Otherwise stated, in the illustrated embodiment, angled area 37 has opposite forward and rearward edges corresponding to leading and trailing edges 49, 47. Other variations are possible in which leading and trailing boundaries 43, 45 of angled area 37 do not coincide with edges to a planer surface, but rather may be intermediate locations on a larger geometry extending either below or outwardly from leading boundary 43 or above and outwardly in the opposite direction from trailing boundary 45, or without such larger geometries necessarily being edges of angled area 37.

In any of its various implementations, angled area 37 is configured, that is, sized and oriented, to form a resultant wind vector RW at trailing boundary 45. Resultant wind vector RW is directed generally outwardly from trailing boundary 45, in this case trailing edge 47. Resultant wind vector RW has a greater force than wind source vector WS by virtue of the disclosed configurations of solar array 23, and wind turbine 25 is suitably located to take advantage of this arrangement. In this manner, wind speed of the source of wind has been increased not only proximate to angled area 37 and its solar panel or panels 27, but also proximity to wind turbine 25 may periodically create a restricted area potentially contributing to such wind speed increase. The increase is generally in a direction suitable to increase rotational speed of wind turbine 25 from what otherwise would have occurred absent such configurations of solar array 23 and wind turbine 25. Blades 31 of wind turbine 25 are thus located and oriented relative to trailing boundary 45 to be impinged upon by resultant wind vector RW.

It will be appreciated that the aerodynamic and other fluid dynamic behavior of wind extending from trailing boundary 45 and trailing edge 47 toward blades of wind turbine 25 may be both complex and variable, depending on numerous variables. Accordingly, such behaviors have been somewhat simplified and represented schematically and collectively as resultant wind vector RW. It is not necessary for the operability and effectiveness of the current disclosure to fully predict laminar flow and turbulent conditions which may occur at trailing edge 47, because whatever collection of vectors are generated by virtue of angling solar panels 27 in proximity to wind turbine 25, such collection of vectors and its representative resultant wind vector WS give rise to increased RPMs of wind turbine 25 beyond those ordinarily achieved without the configuration of solar power system 21.

Though the implementation illustrated in FIGS. 1-3 shows angled area 37 being planar, it is also possible for angled area 37 to comprise non-planar geometries, including curvilinear, concave, convex, or other complex geometries, as photovoltaic technology and solar panels 27 in such geometries may likewise be suitable.

Solar panels 27 have opposite surfaces 51, one of which comprises windward surface 35 described above, while the surface opposite windward surface 35 may be termed the leeward surface 53. While opposite surfaces 51 in the illustrated implementation are planar, again, non planar configurations may likewise be suitable for certain applications. For example, in certain implementations, solar panels 27 may have their opposite surfaces 51 configured with an airfoil profile to further take advantage of aerodynamic principles as wind source vector WS travels across angles area 37 to create resultant wind vector RW at trailing edge 47 thereof.

Furthermore, in the illustrated implementation of multiple solar panels 27, the plurality of solar panels may be disposed in a solar panel arrangement in which the opposite surfaces are disposed in a coplanar manner to each other. Still further, solar panels 27 in the foregoing solar panel arrangement may arranged contiguously and with opposing ones of the outer edges abutting each other to form a continuous, planar surface. Solar panels 27 may be a plurality of subcomponents to what may be viewed as a single solar panel having a combined panel area comprising the individual surface areas of component solar panels 27, such combination making up the solar panel arrangement. Angled area 37 in the illustrated implementation is coextensive with the combined panel area of the solar panel arrangement shown, and thereby the solar panel arrangement terminates at trailing edge 47 which is likewise the trailing boundary 45 of angled area 37. Still other configurations of solar panels 27 are likewise suitable.

The solar panel arrangement, whether comprised of a single solar panel 27 or a plurality of solar panels 27 as shown, may be in the form of a quadrilateral, in which case the solar panel arrangement of one or more solar panels 27 comprises parallel, opposite edges and parallel opposite sides. In such configuration, angled area 37 is not only coextensive with opposite leading and trailing edges 43, 45 but also opposite sides of the quadrilateral.

Angled area 37 extends in a positive slope from leading edge 49 to trailing edge 47 thereby imparting an upward slope to windward surface 35 terminating in a trailing edge 47. Trailing edge, in this implementation is higher thus defining an upper edge relative to leading edge 49, which is lower relative to a base or horizontal frame of reference. In such orientation, wind source vector WS impinges upon windward surface 35 and travels toward the upper edge thereof. Alternately, the opposite arrangement (not shown) may be suitable in certain applications. That is, angled area 37 may extend in a negative slope such that leading edge 49 is higher than trailing edge 51. In either case, aerodynamic principles and other behaviors of the source of wind create increased wind speed at trailing edge 47, whether located relatively above or below leading edge 49.

Solar panels 27 may include photovoltaic arrangements in any suitable density, chemical composition, or other photovoltaic characteristics in any number of physical arrangements. Solar panels 27 may comprise rigid elements, flexible film, or other technologies, and may be of any suitable photovoltaic composition, such as silicon, polysilicon, or crystalline silicon. Solar panel 27 in the illustrated implementation are bifacial, with one photovoltaic arrangement on windward surface 35 and the other on leeward surface 53.

Blades 31 extend longitudinally relative to horizontal access 29 and shaft 33 to define a corresponding blade length. In the illustrated implementation, trailing edge 47 of solar array 23 extends from one side to the other to define a corresponding trailing edge length. Horizontal axis 29 is parallel to trailing edge 47 and extends partially or fully between the opposite sides of solar array 23. As illustrated length of trailing edge 47 is greater than or equal to length of blades 31, so that wind turbine blades 31 are in operative proximity to trailing edge 27 over the length of blades 31.

Hybrid wind and solar energy generating system 21 may be secured to a building, ground level or raised platform, on the ground, or on any other suitable structure, by means of helical or other suitable pilings. System 21 includes an azimuth mount 55 to which solar array 23 and wind turbine 25 are connected. Azimuth mount 55 not only permits rotation of solar array 23 and wind turbine 25, but orchestrates positions of solar array 23 and wind turbine 25 as a function of solar and wind conditions, so as to optimize energy generation by system 21. To that end, azimuth mount 55 is controlled or operatively connected to a computer-implemented control system 59 (FIG. 1) suitably connected or located in operative proximity to azimuth mount 55, Control system 59 is configured to rotate the position of solar array 23 and wind turbine 25 relative to azimuth positions, sun, and wind, such rotations being determined in response to environmental conditions, such as solar and wind conditions.

Figure 7:
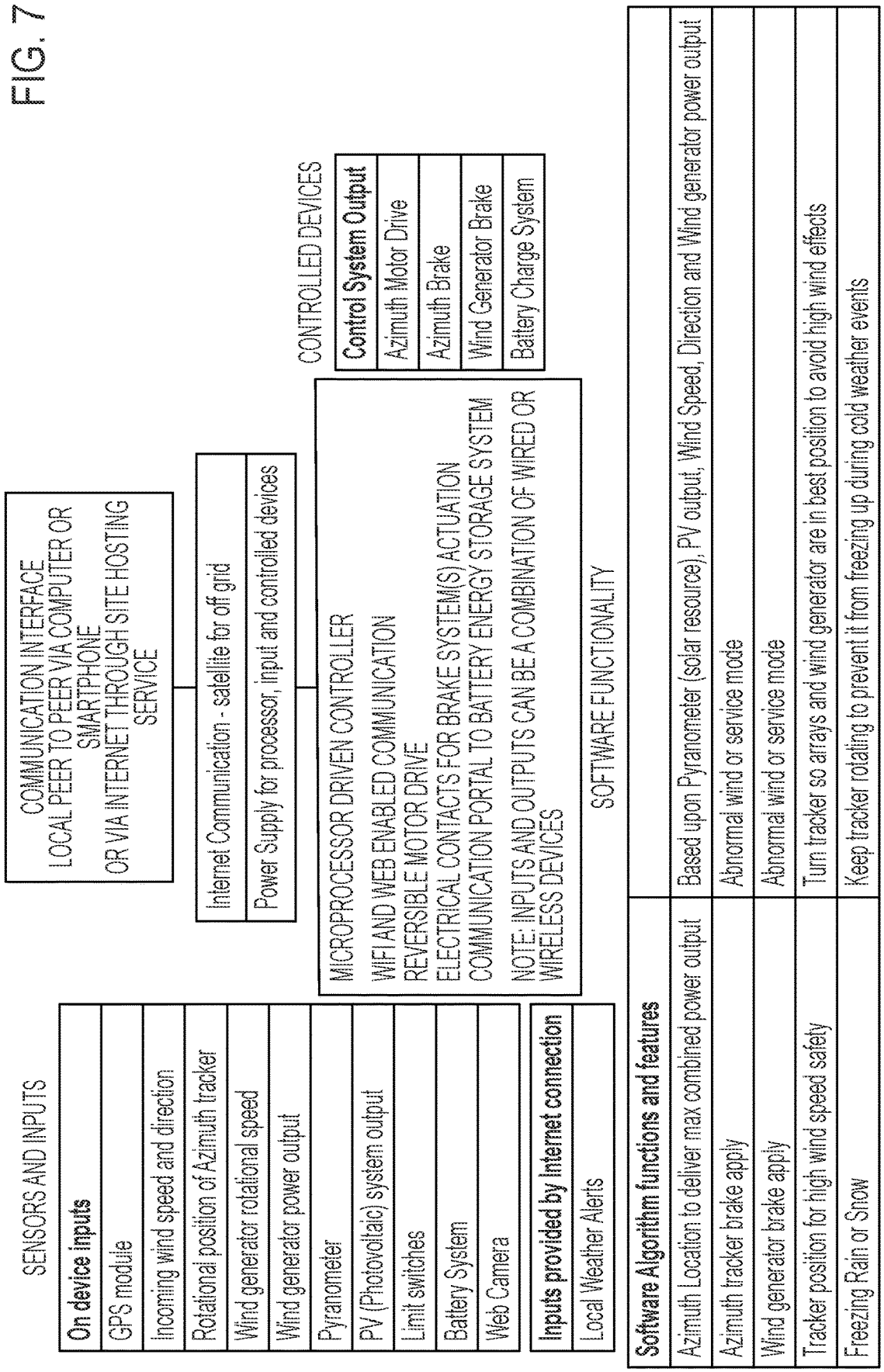
FIG. 7 is a block diagram of a suitable control system for a hybrid wind and solar energy generating system according to the present disclosure.

One suitable implementation of control system 59 is shown in the block diagram of FIG. 7. Control system 59 includes a computer processor for executing computer instructions associated with the control system. Various hardware components of the control system include a GPS module programmed to determine astronomical location of the sun as a function of geographic location of solar array 23. Control system likewise includes an anemometer to determine wind speed and direction, and a pyranometer configured to determine characteristics of the sun or comparable solar resources. System 21 includes sensors to measure power outputs of wind turbine 25, as well as photovoltaic performance of solar array 23, and one or more sensors to track movement and current position of the azimuth mount 55, including limit switches and calibration switches. Control system 59 is connected to such sensors so as to receive inputs therefrom.

The computer programming may be in the form of a programmable logic controller (PLC) or other means for introducing instructions into control system for azimuth mount 55. As such, the program system is capable of performing any number of suitable control functions for system 21. One suitable method of operation involves receiving inputs corresponding to the location of the sun, wind speed direction, and intensity of the solar resource. Based on such inputs, a determination of optimal energy generation is made. Once optimal energy generation has been determined, a comparison can be made between such optimal energy generation and the corresponding measured power outputs from the sensors. If the measured power outputs are less than values associated with the optimal energy generation, suitable programming can determine at least one revised position for the azimuth mount different from the current azimuth mount position. The revised azimuth position may be outputted either for review by an operator or for generating suitable commands to servo motors or other mechanisms to rotate system 21 to the revised azimuth position.

Other operational functions may be controlled by the control system through azimuth mount 55. In another implementation, for example, control system may be configured to receive a current combined power output value for both wind turbine 25 and solar array 23. The control system may process inputs from the anemometer, the pyranometer, and the GPS module to determine a set of alternative azimuth positions associated with power outputs determined to be greater than the current combined power output determined from the sensors. Upon determination that there is at least one alternative azimuth position associated with a greater power output, suitable programming may generate a command to rotate the azimuth mount to the alternative azimuth position. One or more of the foregoing control scenarios may be reiterated to determine which of multiple alternative, azimuth positions results in the greatest power, or the nearest value to the calculated optimal power generation benchmarked by the control system.

Figure 4:
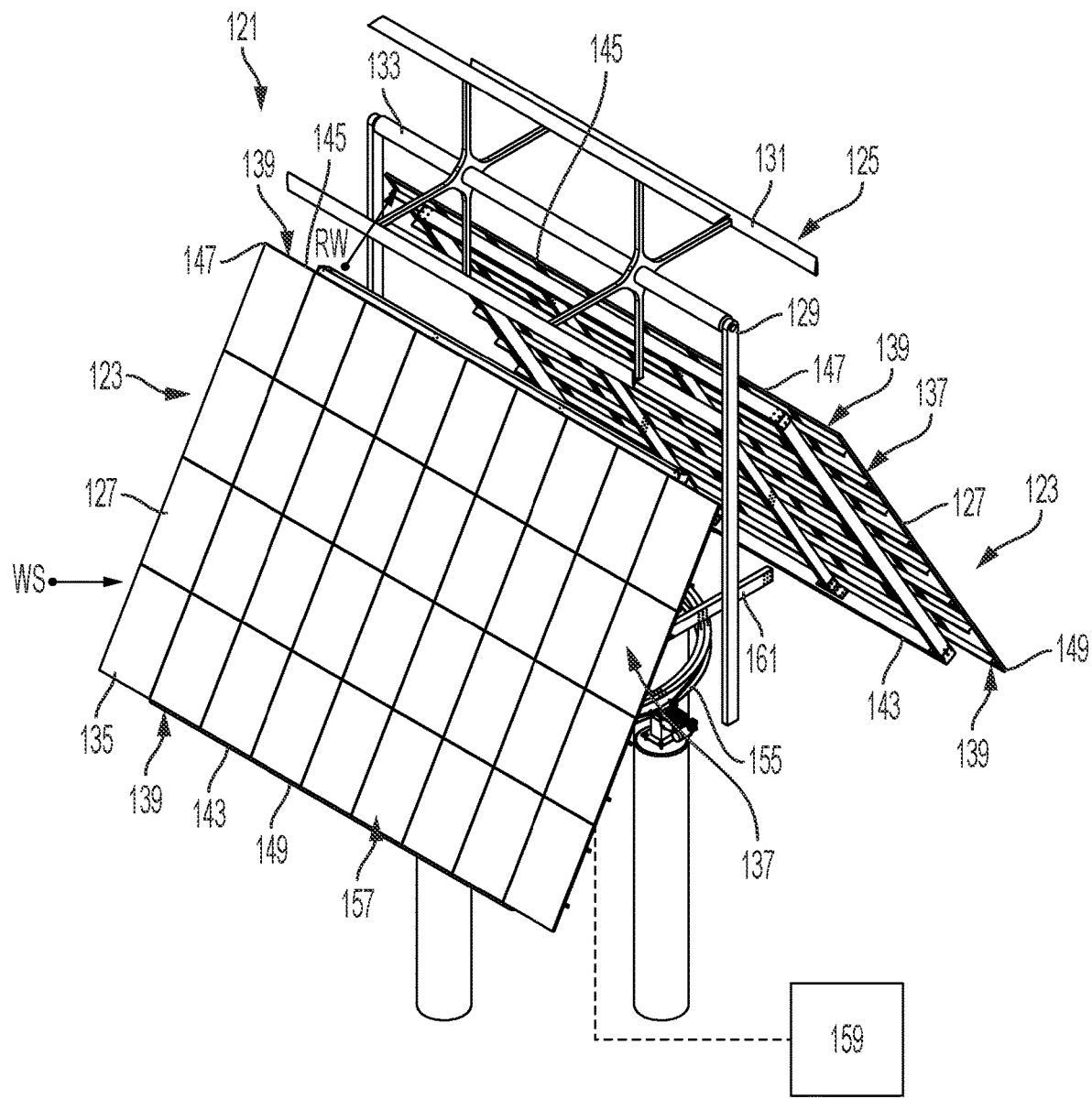
FIG. 4 is an isometric view of another implementation of a hybrid wind and solar energy generating system according to the present disclosure.
Figure 5:
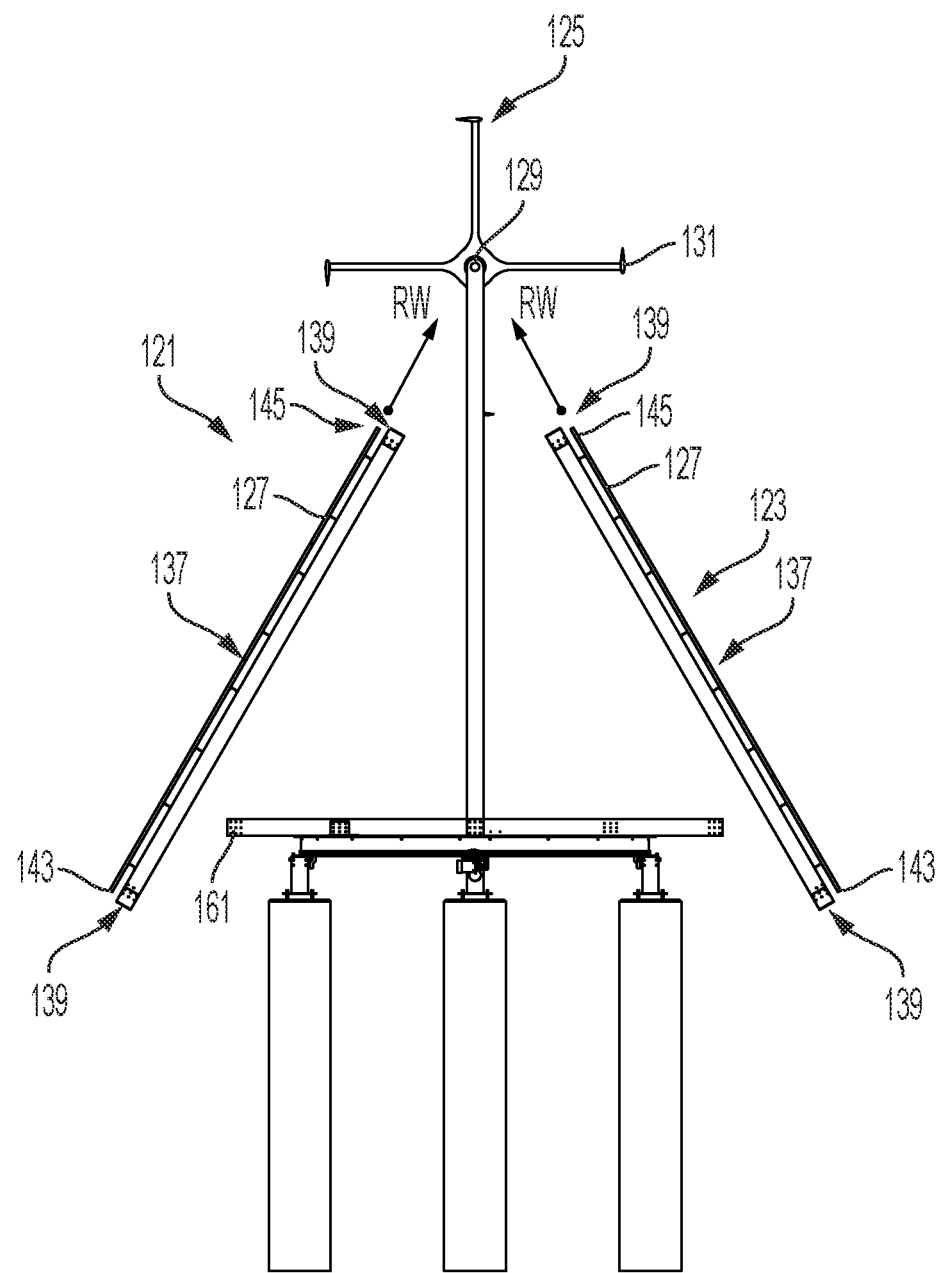
FIG. 5 is a side elevational, partly schematic view of the system of FIG. 4.
Figure 6:
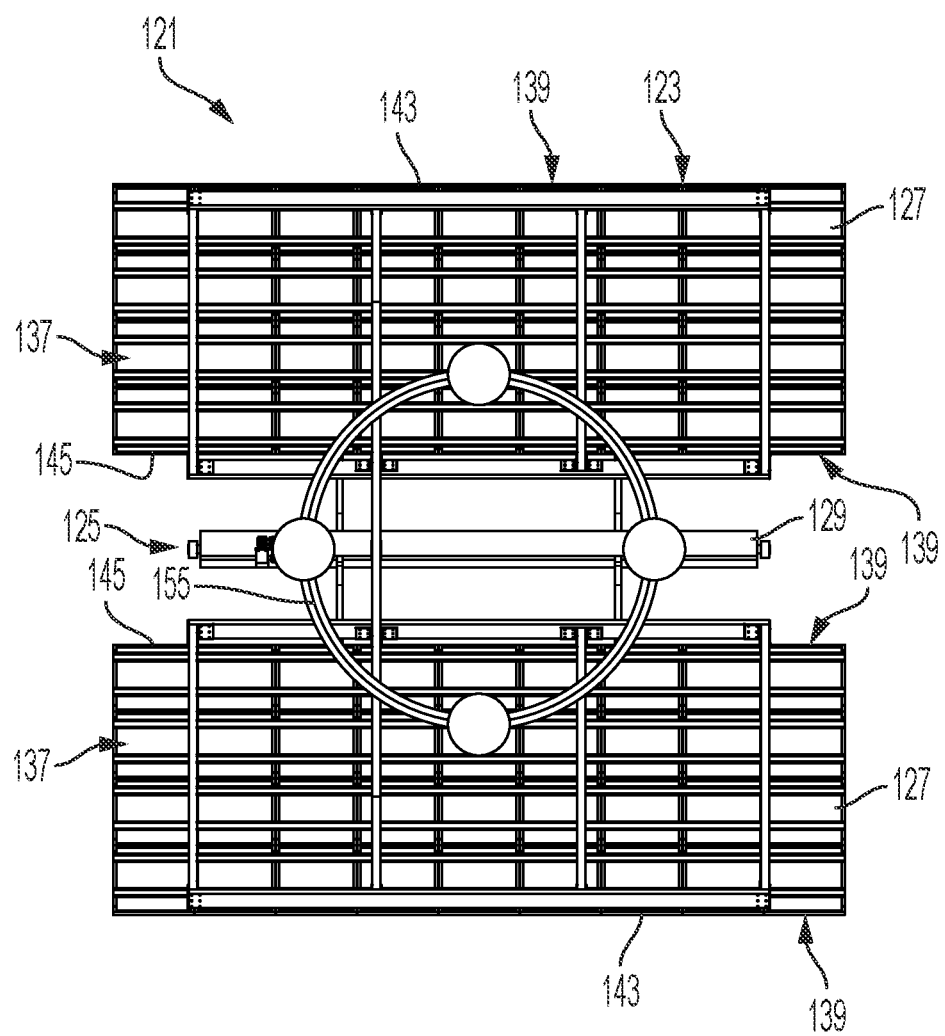
FIG. 6 is a bottom plan view of the system of FIGS. 4-5.

Referring now more particularly to FIGS. 4-6, another implementation according to the present disclosure has a system 121 in which there are two, solar arrays 123 mounted at 180° to each other as shown. Solar arrays may thus be symmetrical or mirror-images of one another. As such, reference numbers used for the single solar array 23 and its implementation of FIGS. 1-3 are used in FIGS. 4-6, but with the numeral 1 preceding the reference numerals in FIGS. 4-6 for components similar to those of FIGS. 1-3. In the implementation of FIGS. 4-6, the two solar arrays 2123 are oriented to slope toward each other from respective lower boundaries 143 to upper boundaries 145. As such, angled areas 137 extend between respective lower and upper boundaries 143, 145. A plurality of solar panels 127 define respective leading and trailing edges 149, 147.

In this implementation, there is a single wind turbine 125 located proximate the upper or trailing edges 147 of both solar panels 127 and in operative proximity thereto.

The dual solar arrays 123 facing 180° from each other and sloping upwardly to an apex zone, above which wind turbine 145 has been mounted, have a number of synergistic effects. In certain implementations, such synergistic effects may provide improved power generation beyond the single solar array implementation of FIGS. 1-3. For example, in terms of optimizing total energy output, hybrid system 121 offers additional flexibility to control system as to azimuth positions available to adapt to sun and wind conditions. The increased force of the resultant wind vector RW for system 121 may be gained by orienting either of the arrays 123 toward wind source vector WS, regardless of the position of solar resource which would actuate the photovoltaic components of solar panels 127. Otherwise stated, if the solar resource is not optimally located relative to the direction of the source of wind relative to one of the solar arrays 123 (or vice versa), it is more than likely that the other of the solar arrays 123 will be in a position or positionable to increase energy output from the solar resource. So, for example, if the sun is on one side of the dual solar array system 121, and the wind is on the other side, such dual arrangement may increase power output by permitting turbine 145 to be impinged upon by a resultant vector RW from the solar array 123 oriented generally toward the source of wind, while also optimizing photovoltaic output from the solar array 123 facing the solar resource. The operational flexibility of having two, angled solar arrays 123 positioned at two, different azimuth locations is, of course, not limited to the specific instance where the sun may be opposite the wind direction, but likewise applies to any number of intermediate scenarios whenever there is an angular differential between the location generally normal to wind source vector WS and the solar resource. Accordingly, control system 159 (FIG. 4) may determine any number of optimal total power outputs of any number of intermediate positions, which alternative positions seek to address the angular differences between wind direction and location of solar resource (i.e., the sun).

Still further, the oppositely oriented solar array is 123, when solar panels 127 are bifacial, allows system 121 two capture solar energy from albedo bounces. By way of example only, direct normal solar radiation passing underneath a leading edge 149 of one of the solar arrays 123 may impinge upon the underside of the other of the solar arrays 123 and thus activate the face on the underside of such bifacial, solar panel 127.

Solar array(s) 23, 123, solar panels 27, 127, and wind turbine 25, 125 are suitably mounted relative to each other by means of various elongated frame elements 61, 161 shown schematically in FIGS. 1-6. Although wind turbine 45, 145 and solar panels 27, 127 are shown as fixedly mounted relative to each other when in operation, it is within the scope of this disclosure for turbine 45, 145 and solar arrays 23, 123 to be moveable relative to each other, either by manual adjustment or by control system 59, 159 in response to sun and wind conditions. In addition, suitable manipulation, detachment, or other reconfigurations of the components may be provided to deal with seasonal variation, adverse weather events, or other operational needs associated with installation environments for systems 21, 121, all of which features are within the scope of the present disclosure.

Although dimensions of the various components may be varied depending on output requirements, environmental conditions, and any other number of variables, solar arrays 23, 123 include bifacial photovoltaic modules in a ten kilowatt configuration per array, both arrays being symmetrical angled at 25° for arrays 123, and at an angle between 45 and 60 degrees for array 23, relative to a suitable ground or reference plane. Turbine 45, 145 may have blades 31, 131 radially mounted at a distance of 71.5 inches, with an airfoil-like or tear-drop profile, such as NACA0015 airfoil, extending a chord length of 12 inches. Upper edges of solar arrays 123 are angled and sized and located relative to each other to assure resultant wind vector WR is materially greater than the wind speed associated with when source vector WS. In one suitable implementation, such as that shown in FIGS. 4-6, the separation of upper edges 149 is between 90 and 100 inches, preferably 95 inches with an angle of 25° for respective panels 127.

Although the location of wind turbine 45, 145 relative to top or trailing edges of solar panels 27, 127 may be varied depending on average wind conditions correspond to the location of system 21, 121, or other environmental or power output factors, in one suitable implementation, turbine 45, 145 is mounted centrally between arrays 123. In one implementation, blades 31, 131 are located so that bottom dead center position is between 5 and 9 inches (measured as a vertical distance), from upper edges 47, 147 of panel 27 or panels 127, preferably between 6.8 and 7.0 inches therefrom.

In one suitable implementation, an array of individual solar panels 127 can have a combined width of 355 inches, and panel lengths between 200 and 300 inches, though other dimensions for other applications are likewise suitable. Length of turbine blades 31, 131 may be 270 inches in the illustrated implementations.

In another suitable implementation, the horizontally disposed turbine may be held by an adjustable arm which permits slight relative movement relative to the solar array, depending on wind and other atmospheric conditions. The relative movement of the turbine and the solar array is sufficient to reduce the amount of destructive interference potentially experienced under detected atmospheric conditions, which would otherwise occur from the geometries and spacing of the wind turbine from the solar array.

The adjustable arm also allows the turbine to be lowered to be out of operative proximity to the solar array or to provide for ease of maintenance of either the solar array or the turbine.

The operations and advantages of the hybrid wind and solar energy generation system 21, 121 are apparent from the foregoing disclosure. To optimize energy generation, the operative connection between the turbine and solar array described above involve programmable logic or other electronic or computer-implemented connections between the energy outputs of solar array 23 and turbine 25.

Performance testing and performance estimates have shown that the hybrid wind and solar system is superior to systems that rely solely on either solar or wind sources. Suitable testing of a 1:8 scale model of this system in a 40 mph wind speed, showed that the location of the solar array in its angled position relative to the horizontally disposed turbine increased the turbine's revolutions per minute by up to 200% when compared to the turbine unit without an array proximate thereto.

The solar panel or solar array is located to increase the wind which would otherwise be available to power the turbine if such array were not influencing the wind exposed to such turbine.

In many climates or environments, increased power generation by the solar array occurs at different times of day or different seasons than increased power from wind energy. Thus, the increased or peak efficiency of one type of energy may supplement the lower or less efficient operations of the other energy system, and thus smooth out fluctuations by virtue of their combination into the disclosed hybrid wind and solar system. As such, daily, monthly, or seasonal power fluctuations that may result from alternating peak or optimal timeframes may be reduced significantly.

The foregoing description and disclosed implementations are meant to be exemplary only, and should not be considered as limitations to this disclosure, as other variations are likewise within its ambit. For example, solar array 23 and wind turbine 25 may be movably mounted relative to each other, so as to adapt to different applications, different weather conditions, seasons, and other changing usage parameters. System 21 may include suitable mechanisms for altering relative positions of solar array 23 and wind turbine 25 relative to each other either in response to user input, or adaptively, in response to detection of certain environmental parameters. In another possible variation, the solar array and its associated mounting structure serves as the tower normally associated with a wind turbine. In such implementation, the wind turbine, whether horizontal or vertical, has its power generation supplemented as the tower itself generates power from solar exposure. In other words, the solar array, mounted to the same tower where the turbine has been mounted is located to increase wind speed towards the turbine, thus increasing its power output.

It will be further understood that various changes in the details, materials, and arrangements of the parts which have been described and illustrated in order to explain the nature of this invention may be made by those skilled in the art without departing from the scope of the invention as expressed in the claims. One skilled in the art will appreciate that the implementations discussed above are non-limiting. It will also be appreciated that one or more features of one implementation may be partially or fully incorporated into one or more other implementations described herein.

What is claimed is:

1. A hybrid wind and solar energy generating system comprising:
   at least one, rotatably mountable solar array, the solar array including at least one solar panel having two, opposite surfaces;
   wherein the solar panel is selectively orientable relative to a source of wind so that one of the surfaces of the solar panel defines a windward surface, wherein the windward surface is impinged upon by a wind source vector associated with the source of wind, the wind source vector impinging upon the windward surface at an angle that is at least incident to the windward surface;
   wherein the windward surface comprises an angled area extending to terminate in boundaries to define a bluff body relative to the wind source, one of the boundaries defining a leading boundary upwind relative to the source of wind and the other of the boundaries defining a trailing boundary downwind to the source of wind;
   wherein the angled area is sufficiently large to form a resultant wind vector at the trailing boundary, the resultant wind vector directed outwardly from the trailing boundary and having greater force than the wind source vector, whereby windspeed of the source wind has been increased proximate to the panel and outwardly from the trailing boundary thereof;
   a wind turbine mounted in operative proximity to the solar array, the wind turbine having a horizontal axis of rotation, the wind turbine having blades located and oriented relative to the trailing boundary to be impinged upon by the resultant wind vector;
   the system further comprises:
   an azimuth mount to which the solar array and the wind turbine are connected; and
   a computer-implemented control system for the azimuth mount configured to rotate the position of the solar array and the wind turbine to optimize energy generation in response to solar and wind conditions; and
   wherein the control system includes:
   a computer processor for executing computer instructions of the control system;
   a GPS module adapted to receive inputs for latitude and longitude position, date and time of day to be processed to determine sun position, including azimuth and sun elevation relative to location of the solar array;
   an anemometer to determine wind speed and direction;
   a pyranometer configured to determine characteristics of a solar resource;
   sensors to measure power outputs of the wind turbine and photovoltaic performance of the solar array, respectively:
   sensors to track current position of the azimuth mount;
   computer programming which, when executed, is capable of performing the following steps:
   receiving inputs corresponding to the location of the sun, the wind speed and direction, and the solar resource;
   determining optimal energy generation corresponding to the received inputs;
   comparing the determined optimal energy generation to measured power outputs from the sensors;
   if the measured power outputs are less than the optimal energy generation, determining at least one revised azimuth position different from the current azimuth position; and
   outputting the revised azimuth position.

2. The system in claim 1, wherein the angled area terminates at a trailing edge, the trailing boundary corresponding to the trailing edge.

3. The system of claim 1, wherein the angled area is planar.

4. The system of claim 3, wherein the opposite surfaces of the solar panel are planar.

5. The system of claim 1, wherein the solar array comprises a plurality of the solar panels disposed in a solar panel arrangement having opposite surfaces of each of the solar panels disposed coplanarly to each other.

6. The system of claim 5, wherein the solar panels have respective surface areas terminating in respective outer edges, the solar panels arranged contiguously and with opposing ones of the outer edges abutting each other to form a continuous, planar surface having a combined panel area comprising the surface areas of the plurality of the panels.

7. The system of claim 6, wherein the angled area is co-extensive with the combined panel area.

8. The system of claim 7, wherein the solar panel arrangement terminates at a trailing edge, the trailing boundary of the angled area corresponding to the trailing edge.

9. The system of claim 1, wherein the solar panel comprises parallel, opposite edges and parallel, opposite sides to define a quadrilateral panel, the angled area being co-extensive with the opposite edges and opposite sides, the trailing boundary located at one of the opposite edges, the leading boundary located at the other of the opposite edges.

10. The system of claim 9, wherein the angled area extends in a positive slope from the leading edge to the trailing edge to impart an upward slope to the windward surface terminating in an upper edge, whereby the wind source vector impinges upon the windward surface and travels toward the upper edge thereof.

11. The system of claim 10, wherein the panel surface opposite the windward surface comprises a leeward surface, wherein the panel comprises a bifacial photovoltaic arrangement corresponding to the windward and leeward surfaces.

12. The system of claim 9,
wherein the blades of the turbine are orbitally mounted at a predetermined radial distance from the horizontal axis and extend longitudinally relative to the horizontal axis to define a corresponding blade length;
wherein the trailing edge extends from one of the opposite sides of the panel to the other of the opposite sides to define a trailing edge length;
wherein the horizontal axis of the wind turbine is parallel to the trailing edge;
wherein the blade length and the trailing edge length are equal, whereby the wind turbine blades are in operative proximity to the trailing edge over the length of the blades.

13. The system of claim 12, wherein the turbine comprises four blades arcuately spaced at 90-degree intervals.

14. The system of claim 1, further comprising two of the solar panels mounted at 180-degrees to each other and having lower and upper edges, the angled areas of each of the panels extending between respective lower and upper edges to define respective leading and trailing edges;
wherein the solar panels are oriented to slope toward each other from respective lower edges to upper edges;
wherein the wind turbine is located in operative proximity to both trailing edges of the solar panels.

15. A hybrid wind and solar energy generating system comprising:
at least one, rotatably mountable solar array, the solar array including at least one solar panel having two, opposite surfaces;
wherein the solar panel is selectively orientable relative to a source of wind so that one of the surfaces of the solar panel defines a windward surface, wherein the windward surface is impinged upon by a wind source vector associated with the source of wind, the wind source vector impinging upon the windward surface at an angle that is at least incident to the windward surface;
wherein the windward surface comprises an angled area extending to terminate in boundaries to define a bluff body relative to the wind source, one of the boundaries defining a leading boundary upwind relative to the source of wind and the other of the boundaries defining a trailing boundary downwind to the source of wind;
wherein the angled area is sufficiently large to form a resultant wind vector at the trailing boundary, the resultant wind vector directed outwardly from the trailing boundary and having greater force than the wind source vector, whereby windspeed of the source wind has been increased proximate to the panel and outwardly from the trailing boundary thereof;
a wind turbine mounted in operative proximity to the solar array, the wind turbine having a horizontal axis of rotation, the wind turbine having blades located and oriented relative to the trailing boundary to be impinged upon by the resultant wind vector;
the system further comprises:
an azimuth mount to which the solar array and the wind turbine are connected; and
a computer-implemented control system for the azimuth mount configured to rotate the position of the solar array and the wind turbine to optimize energy generation in response to solar and wind conditions; and
wherein the control system includes:
a computer processor for executing computer instructions of the control system;
a GPS module adapted to receive inputs for latitude and longitude position, date and time of day to be processed to determine sun position, including azimuth and sun elevation relative to location of the solar array;
an anemometer to determine wind speed and direction;
a pyranometer configured to determine characteristics of a solar resource;
sensors to measure power outputs of the wind turbine and photovoltaic performance of the solar array, respectively;
sensors to track current position of the azimuth mount;
computer programming instructions which, when executed, are capable of performing the following steps:
receiving a current combined power output value of the wind turbine and the solar array;
processing inputs from the anemometer, the pyranometer, and the GPS module to determine a set of alternative azimuth positions associated with power outputs greater than the current combined power output; and
upon a determination that there is at least one alternative azimuth position associated with greater power output, generating a command to rotate the azimuth mount to the alternative azimuth position.

16. The system of claim 15, wherein the programming comprises instructions, which, when executed, repeat the steps of determining if there is the alternative azimuth position until a determination is made that there are no alternative azimuth positions greater than the azimuth position corresponding to the current combined power output.

17. A hybrid wind and solar energy generating system, comprising:
two, rotatably mountable solar arrays, each of the solar arrays including at least one bifacial, solar panel having two, opposite surfaces with photovoltaic cells disposed thereon;
wherein the solar panels are mounted at 180-degrees to each other and have lower and upper edges to define respective leading and trailing edges;
wherein the solar panels are oriented to slope toward each other to define respective angled areas between the respective lower edges and upper edges;
wherein a wind turbine is located in operative proximity to each of the trailing edges of the solar panels;
an azimuth mount to which the solar array and the wind turbine are connected; and
a computer-implemented control system for the azimuth mount configured to rotate the position of the solar arrays and the wind turbine to optimize energy generation in response to solar and wind conditions;

wherein the control system includes:
a computer processor for executing computer instructions of the control system;
a GPS module adapted to receive inputs for latitude and longitude position, date and time of day to be processed to determine sun position, including azimuth and sun elevation relative to location of the solar array;
an anemometer to determine wind speed and direction;
a pyranometer configured to determine characteristics of a solar resource;
sensors to measure power outputs of the wind turbine and photovoltaic performance of the solar array, respectively;
sensors to track current position of the azimuth mount;
wherein the control system, in response to inputs from the anemometer, pyranometer, and sensors, is programmed to selectively rotate the azimuth mount to a position optimizing (1) augmentation of a source wind vector impinging on a first one of the solar arrays to produce a resultant wind vector at the trailing edge of the first one of the solar arrays, and (2) exposure level of a second one of the solar arrays to a solar resource, whereby improved power output of the turbine and the solar arrays may occur when the direction of the wind source vector differs from the direction of normal sun radiation by up to 180 degrees.

* * * * *